US012598431B2

(12) United States Patent
Fok

(10) Patent No.: US 12,598,431 B2
(45) Date of Patent: Apr. 7, 2026

(54) SOUND NOISE-MASKING DEVICE AND MASKING EARPHONE

(71) Applicant: Hiu Ling Fok, Hong Kong (CN)

(72) Inventor: Hiu Ling Fok, Hong Kong (CN)

( * ) Notice: Subject to any disclaimer, the term of this patent is extended or adjusted under 35 U.S.C. 154(b) by 171 days.

(21) Appl. No.: 18/514,274

(22) Filed: Nov. 20, 2023

(65) Prior Publication Data

US 2024/0397269 A1 Nov. 28, 2024

(30) Foreign Application Priority Data

May 24, 2023 (CN) ......................... 202310592035.8

(51) Int. Cl.
*H04R 25/00* (2006.01)

(52) U.S. Cl.
CPC ............. *H04R 25/43* (2013.01); *H04R 25/48* (2013.01); *H04R 2225/39* (2013.01); *H04R 2225/41* (2013.01)

(58) Field of Classification Search
CPC .... H04R 25/43; H04R 25/48; H04R 2225/39; H04R 2225/41; H04R 1/1041; H04R 2460/01; H04R 2460/13; H04R 1/1083; H04R 2201/105; H04R 25/75; Y02T 90/00; A61F 11/06; A61F 11/145; G10K 11/17854; G10K 11/1752; G10K 2210/30231; A61B 5/7203; G10L 21/0208
See application file for complete search history.

(56) References Cited

U.S. PATENT DOCUMENTS

| | | | | |
|---|---|---|---|---|
| 10,582,286 | B2 * | 3/2020 | Eddins | H04R 25/505 |
| 11,620,977 | B2 * | 4/2023 | Birmingham | G10K 11/17873 381/71.6 |
| 2022/0415301 | A1 * | 12/2022 | Birmingham | A61B 5/6817 |
| 2023/0396917 | A1 * | 12/2023 | Robertson | H04R 1/1083 |

* cited by examiner

*Primary Examiner* — Angelica M McKinney
(74) *Attorney, Agent, or Firm* — Birchwood IP

(57) ABSTRACT

A sound noise-shielding device and a masking earphone are provided in this disclosure. Earphones, hearing aids and noise-masking earplugs are integrated. The noise-masking earplugs are used to directly block real sounds, so that for patients with misophonia, stress response caused by sounds received by the earphones can be reduced, and these sounds can be converted into other acceptable sounds by the bone conduction earphones. Sometimes there may be some mixed sounds at the same time, and the computer can't distinguish them because of their fusion. A separate network is used to extract fused audio separately, and a spectrogram of an individual sound is obtained correspondingly and detected. By training the network, a sound recognition model that can accurately detect sound information can be obtained.

8 Claims, 2 Drawing Sheets

S101: Acquiring a received sound

S102: Obtaining sound information through a sound recognition model base on the received sound S103: Acquiring a danger information set S104: Obtaining a delivery sound based on the received sound, the sound information and the danger information set

SOUND NOISE-MASKING DEVICE AND MASKING EARPHONE

CROSS-REFERENCE TO RELATED APPLICATIONS

This is a U.S. patent application which claims the priority and benefit of Chinese Patent Application Number 202310592035.8, filed on May 24, 2023, the disclosure of which is incorporated herein by reference in its entirety.

TECHNICAL FIELD

The disclosure relates to the technical field of computers, in particular to a sound noise-masking device and a masking earphone.

BACKGROUND

At present, earphones are generally used for listening to music or calling. The earphones can receive a sound and immediately output another sound through bone conduction earphones, with a principle similar to that of a voice changer. Some people may suffer from misophonia. For example, some people may feel uncomfortable when hearing certain sounds, and thus noise-masking earphones are needed by users. Such a sound-changing earphone can convert a sound for which the users may feel uncomfortable into a sound that the users like or cancel it. For example, some people may be afraid of hearing dog barking, and the earphone can automatically mask a dog barking sound after receiving it. Noise-masking earphones can help patients with misophonia to block corresponding sounds, which facilitates health of the patients with misophonia.

SUMMARY

The disclosure aims to provide a sound noise-masking device and a masking earphone, which are used for solving problems in the prior art described above.

In a first aspect, a sound noise-masking device is provided in an embodiment of the present disclosure, which includes a sound acquisition module, a sound recognition module, a danger information acquisition module and a danger sound replacement module.

The sound acquisition module is configured for acquiring a received sound. The received sound is a period of external sound received by a noise-masking earphone for misophonia.

The sound recognition module is configured for obtaining sound information through a sound recognition model base on the received sound. The sound information includes a sound category, a sound existence duration and a semantic word. The sound category indicates a category of a creature or an article the sound belongs to. The sound existence duration includes a sound start time and a sound end time. The semantic word represent a word in the sound.

The danger information acquisition module is configured for acquiring a danger information set. The danger information set includes a danger category set and a danger word set. The danger category set includes a plurality of danger categories. The danger word set includes a plurality of danger words. Each of the danger categories indicates a type of a sound that a person with misophonia is not willing to hearing. The danger words are words that patients with misophonia is not willing to hearing.

The danger sound replacement module is configured for obtaining a delivery sound based on the received sound, the sound information and the danger information set.

Optionally, the obtaining the delivery sound based on the received sound, the sound information and the danger information set includes:

obtaining a plurality of replacing audio categories; the plurality of replacing audio categories each being categories of audio that replace a sensitive sound;

traversing the plurality of replacing audio categories in turn to find a replacing audio with a replacing audio category same as the sound category in the sound information so as to obtain an accurate replacing audio, if the sound category belongs to the danger category set or the semantic word belongs to the danger word set; the accurate replacing audio being replacing information corresponding to the sound information;

masking a sound in the received sound with the sound existence duration so as to obtain masked sound; and performing replacement using the accurate replacing audio from a sound starting position of the masked sound to obtain the delivery sound.

Optionally, a training method of the sound recognition model includes:

obtaining a training set; the train set including a plurality of training sounds and a corresponding plurality of labeled data; the plurality of training sounds representing a plurality of sounds that have been received by the noise-masking earphone for misophonia; the plurality of labeled data including a plurality of labeled sound categories, a plurality of labeled semantic words, a plurality of labeled monophonic spectrograms, a plurality of labeled sound start time and a plurality of labeled sound end time; the plurality of labeled sound categories each indicating categories of sounds;

performing short-time Fourier transform on the training sound to obtain a training spectrogram;

separating overlapped sounds based on the training spectrogram to obtain a plurality of training monophonic spectrograms;

obtaining training sound information based on the plurality of training monophonic spectrograms; the training sound information including a training sound category, a training sound existence duration and a training semantic pronunciation; the training sound existence duration including a training sound start time and a training sound end time;

obtaining a monophonic spectrogram loss value based on the plurality of training monophonic spectrograms and the corresponding plurality of labeled monophonic spectrograms;

obtaining a sound category loss value from the training sound category and the labeled sound category by a binary cross entropy loss function;

obtaining a semantic word loss value from the training semantic pronunciation and plurality of labeled semantic words by a binary cross entropy loss function;

obtaining a sound start time loss value from the training sound start time and the plurality of labeled sound start time by a binary cross entropy loss function;

obtaining a sound end time loss value from the training sound end time and the plurality of labeled sound end time by a binary cross entropy loss function;

obtaining a total loss value; the total loss value being a sum of the sound category loss value, the semantic word loss value, the sound start time loss value and the sound end time loss value;

obtaining a current number of training iterations of the sound recognition model and a preset maximum number of training iterations of the sound recognition model; and stopping training when the total loss value is less than or equal to a threshold value or the number of training iterations reaches the maximum number of iterations, so as to obtain a trained sound recognition model.

Optionally, the separating the overlapped sounds based on the training spectrogram to obtain the plurality of training monophonic spectrograms includes:

multiplying the training spectrogram by a first separation matrix to obtain a first monophonic spectrogram; the first separation matrix being a constant for separating a monophonic spectrogram obtained by training from the spectrogram; and the first monophonic spectrogram being a spectrogram with only one sound separated from overlapped sounds;

inputting the spectrogram and the first spectrogram into a frequency switch structure to obtain a first switch value; the first switch value of 1 indicating that the spectrogram can be continuously separated; and the first switch value of 0 indicating that the spectrogram has been separated;

multiplying the spectrogram by a second separation matrix to obtain a second monophonic spectrogram if the first switch value is 1;

inputting the spectrogram, the first monophonic spectrogram and the second monophonic spectrogram into a frequency switch structure to obtain a second switch value; and obtaining a plurality of training monophonic spectrograms by repeatedly obtaining the switch value in the frequency switching structure until the switch value is 0; the plurality of training spectrograms being a plurality of monophonic spectrograms separated when the switch value is 1.

Optionally, the inputting the spectrogram and the first spectrogram into the frequency switch structure to obtain the switch value includes:

graying the spectrogram to obtain a grayed spectrogram;

graying the first spectrogram to obtain a first grayed spectrogram;

subtracting a gray value in the grayed spectrogram from a gray value in the first spectrogram to obtain a gray difference spectrogram;

obtaining a plurality of aggregation-area gray value sets from the gray difference spectrogram by an aggregation algorithm; and obtaining the switch value based on the plurality of aggregation-area gray value sets.

Optionally, the obtaining the switch value based on the plurality of aggregation-area gray value sets includes:

obtaining an optimal aggregation-area gray value set; the optimal aggregation-area gray value set being a set among the plurality of aggregation-area gray value sets that is larger than other aggregation-area gray value sets;

obtaining an optimal aggregation-area gray average; the optimal aggregation-area gray average being an average value of gray values in the optimal aggregation-area gray value set;

setting the switch value to 1 if the optimal aggregation-area gray average is great than a gray threshold; and setting the switch value to 0 if the optimal aggregation-area gray average is less that the gray threshold.

Optionally, the obtaining the training sound information based on the plurality of training monophonic spectrograms includes:

inputting the monophonic spectrogram into a convolutional neural network and extracting features to obtain a training monophonic feature map;

inputting the monophonic feature map into a fully connected layer to obtain the training sound category;

obtaining the training sound existence duration based the training monophonic feature map by a neural network; and inputting the monophonic feature map into a semantic recognition network to obtain the training semantic pronunciation, if the training sound category is human voice.

Optionally, the obtaining the monophonic spectrogram loss value based on the plurality of training monophonic spectrograms and the corresponding plurality of labeled monophonic spectrograms includes:

rearranging the training monophonic spectrograms to obtain a training monophonic vector;

rearranging the labeled monophonic spectrograms to obtain a labeled monophonic vector; and obtaining the monophonic spectrogram loss value from the train monophonic vector and the labeled monophonic vector by a binary cross entropy loss function.

Optionally, the sound masking device further includes a silencing structure and a silencing clip.

The silencing structure is a gourd-shaped cavity structure, a sound absorption opening is provided at a neck end of the silencing structure, a belly cavity of the silencing structure is provided with a plurality of silencing holes penetrating a wall of the belly cavity, an outer wall of the silencing structure is provided with silencing cotton, and the silencing structure can expand or contract.

The silencing clip is arranged at a neck of the silencing structure and configured for clamping or releasing the neck of the silencing structure.

In a second aspect, a noise-masking earphone is provided in an embodiment of the disclosure, which includes a noise-reducing earmuff. The noise-reducing earmuff includes an outer earmuff, an inner earmuff and the sound masking device described in any one of the above.

The inner earmuff is detachably arranged in the outer earmuff through a spring, the outer earmuff can cover cars of a user, and the inner earmuff can be plugged into an external acoustic foramen of the user.

The sound masking device is connected with the outer earmuff. Compared with prior art, embodiments of the disclosure has following beneficial effects.

The sound noise-masking device and the masking earphone are provided in embodiments of the disclosure. The received sound is obtained, and the received sound is a period of external sound received by a noise-masking earphone for misophonia. The sound information is obtained through the sound recognition model base on the received sound. The sound information includes the sound category, the sound existence duration and the semantic word. The sound category indicates the category of the creature or article the sound belongs to. The sound existence duration includes the sound start time and the sound end time. The semantic word represent the word in the sound. The danger information set is obtained. The danger information set includes the danger category set and the danger word set. The danger category set includes the plurality of danger categories. The danger word set includes the plurality of danger words. Each of the danger categories indicates the type of the sound that the person with misophonia is not willing to hearing. The danger words are words that patients with misophonia is not willing to hearing. The delivery sound is obtained based on the received sound, the sound information and the danger information set.

Now, earphones, hearing aids and noise-masking earplugs are integrated. The noise-masking earplugs are used to directly block real sounds, so that for patients with misophonia, stress response caused by sounds received by the earphones can be reduced, and these sounds can be converted into other acceptable sounds by the bone conduction earphones. Sometimes there may be some mixed sounds at the same time, and the computer can't distinguish them because of their fusion. A separate network is used to extract fused audio separately, and a spectrogram of an individual sound is obtained correspondingly and detected. By training the network, a sound recognition model that can accurately detect sound information can be obtained. The spectrogram is multiplied by an inverse matrix to get weights. Through cyclic addition, the training matrix is obtained through the labeled monophonic spectrogram, so that the monophonic spectrogram can be separated and different monophonic spectrograms can be obtained. Difference between two images is obtained from the gray difference and the like. Other unnecessary noise parts are removed according to the aggregation algorithm.

In addition, the noise-masking earphone includes the outer earmuff and the inner earmuff. The inner earmuff extends into the external acoustic foramen to transmit sound to the user's ear. Meanwhile, the outer earmuff covers the user's ear to isolate external sounds from the outside, which can reduce influence of external noise on the user on one hand and prevent the user's earphone from leaking sound to affect surrounding environment on the other hand. To sum up, the masking earphone according to this disclosure can achieve silencing from at least three aspects, with good silencing effect.

Reference numbers are as follows: 100—Sound Masking Device; 110—Silencing Structure; 120—Silencing Clip; 200—Noise-masking Earphone; 210—Noise-reducing Earmuff; 211—Outer Earmuff; 212—Inner Earmuff; 213—Spring; 220—Arc-shaped Connecting Handle 220; Bus 500; Receiver 501; Processor 502; Transmitter 503; Memory 504; Bus Interface 505.

DESCRIPTION OF EMBODIMENTS

The present disclosure will be described in detail with reference to the accompanying drawings.

Embodiment 1

Figures 1, 2:
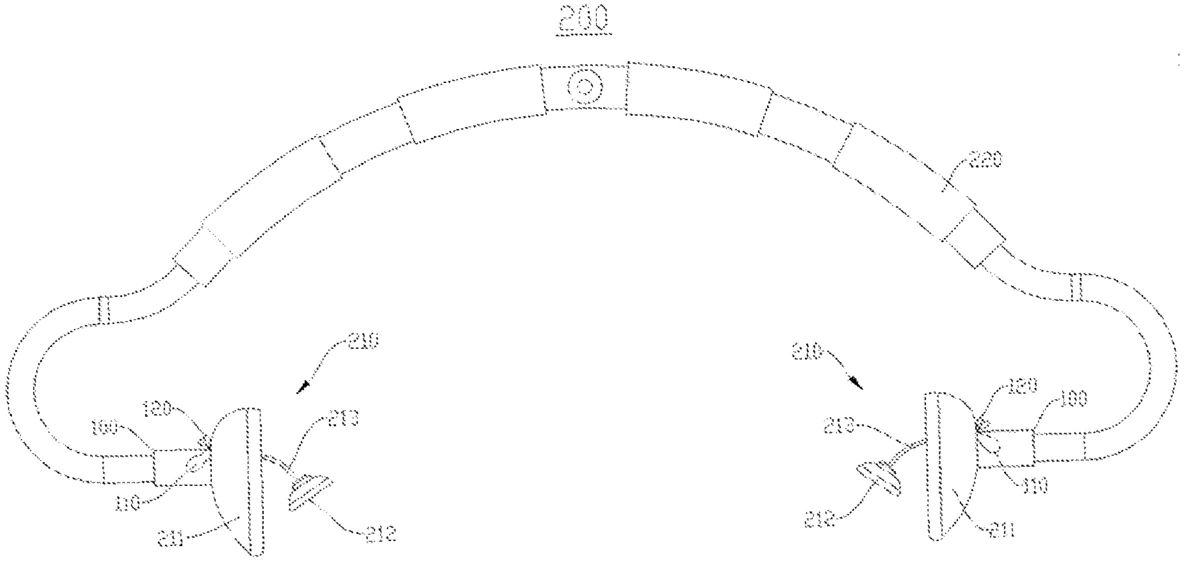
FIG. 1 is a schematic structural diagram of a masking earphone according to an embodiment of the present disclosure.
FIG. 2 is a flowchart of a sound noise-masking method according to an embodiment of the present disclosure.

As shown in FIG. 1, a sound masking device 100 is provided in an embodiment of the present disclosure, which includes a silencing structure 110 and a silencing clip 120.

The silencing structure 110 is a gourd-shaped cavity structure, a sound absorption opening is provided at a neck end of the silencing structure, a belly cavity of the silencing structure is provided with a plurality of silencing holes penetrating a wall of the belly cavity, an outer wall of the silencing structure is provided with silencing cotton, and the silencing structure 110 can expand or contract.

The silencing clip 120 is arranged at a neck of the silencing structure 110 and configured for clamping or releasing the neck of the silencing structure 110.

Optionally, the sound masking device 100 further includes an electronic silencing module, which is configured for determining a sound type and selectively silencing according to the sound type.

The sound masking device 100 functions in absorbing sounds into a belly cavity of the silencing structure 110 through a sound absorbing opening, diffusing sound waves through the silencing hole, and silencing with silencing cotton. The silencing structure 110 can expand or contract, and when the sound is loud, the silencing structure 110 can expand, thereby expanding a space of the belly cavity and increasing an area for dissipating the sound, thus improving silencing effect. In addition, the silencing clip 120 is provided, and when silencing is not needed, the silencing clip 120 can clamp the neck of the silencing structure 110, so that the silencing structure 110 does not cancel the sound. When silencing is needed, the silencing clip 120 releases the neck of the silencing structure 110, so that the silencing structure 110 can absorb and cancel the sound.

Further, the sound masking device 100 further includes an electronic silencing module, which is configured for determining a sound type and selectively silencing according to the sound type. Specifically, the electronic silencing module includes a sound acquisition module, a sound recognition module, a danger information acquisition module and a danger sound replacement module. The sound acquisition module is electrically connected with the sound recognition module, the sound recognition module is electrically connected with the danger information acquisition module, and the danger information acquisition module is electrically connected with the danger sound replacement module.

The sound acquisition module is configured for acquiring a received sound. The received sound is a period of external sound received by the noise-masking earphone for misophonia.

The sound recognition model is configured for obtaining the sound information through the sound recognition model base on the received sound. The sound information includes a sound category, a sound existence duration and a semantic word. The sound category indicates a category of the creature or article a sound belongs to. The sound existence duration includes a sound start time and a sound end time. The semantic word represent a word in the sound.

The danger information acquisition module is configured for acquiring a danger information set. The danger information set includes a danger category set and a danger word set. The danger category set includes a plurality of danger categories. The danger word set includes a plurality of danger words. Each of the danger categories indicates the type of the sound that the person with misophonia is not willing to hearing. The danger words are words that patients with misophonia is not willing to hearing.

The danger sound replacement module is configured for obtaining a delivery sound based on the received sound, the sound information and the danger information set.

With schemes described above, the received sound is obtained, and the received sound is a period of external sound received by a noise-masking earphone for misophonia. The sound information is obtained through the sound recognition model base on the received sound. The sound information includes the sound category, the sound existence duration and the semantic word. The sound category indicates the category of the creature or article the sound belongs to. The sound existence duration includes the sound start time and the sound end time. The semantic word represent the word in the sound. The danger information set is obtained. The danger information set includes the danger category set and the danger word set. The danger category set includes the plurality of danger categories. The danger word set includes the plurality of danger words. Each of the danger categories indicates the type of the sound that the person with misophonia is not willing to hearing. The danger words are words that patients with misophonia is not willing to hearing. The delivery sound is obtained based on the received sound, the sound information and the danger information set. Earphones, hearing aids and noise-masking earplugs are integrated. The noise-masking earplugs are used to directly block real sounds, so that for patients with misophonia, stress response caused by sounds received by the earphones can be reduced, and these sounds can be converted into other acceptable sounds by the bone conduction earphones. Sometimes there may be some mixed sounds at the same time, and the computer can't distinguish them because of their fusion. A separate network is used to extract fused audio separately, and a spectrogram of an individual sound is obtained correspondingly and detected. By training the network, a sound recognition model that can accurately detect sound information can be obtained. The spectrogram is multiplied by an inverse matrix to get weights. Through cyclic addition, the training matrix is obtained through the labeled monophonic spectrogram, so that the monophonic spectrogram can be separated and different monophonic spectrograms can be obtained. Difference between two images is obtained from the gray difference and the like. Other unnecessary noise parts are removed according to the aggregation algorithm.

With continued reference to FIG. 1, a noise-masking earphone 200 is further provided in an embodiment of the present disclosure, which includes a noise-reducing earmuff 210, and the noise-reducing earmuff 210 includes an outer earmuff 211, an inner earmuff 212 and a sound masking device 100.

The inner earmuff 212 is detachably arranged in the outer earmuff 211 through a spring 213. The outer earmuff 211 can cover an ear of a user, and the inner earmuff 212 can be plugged into an external acoustic foramen of the user.

The sound masking device 100 is connected to the outer earmuff 211.

When silencing is needed, the silencing clip 120 is released, so that the sound masking device 100 can absorb the sound, thereby achieving silencing effect, that is, when the user does not want to hear unwanted sounds from the earphone, the sound masking device 100 can be opened to achieve silencing. In addition, the inner earmuff 212 extends into the external acoustic foramen to transmit sound to the user's ear. Meanwhile, the outer earmuff 211 covers the user's ear to isolate external sounds from the outside, which can reduce influence of external noise on the user on one hand and prevent the user's earphone from leaking sound to affect surrounding environment on the other hand. To sum up, the masking earphone 200 according to this disclosure can achieve silencing from at least three aspects, with good silencing effect.

Optionally, the sound masking device 100 is detachably connected with the outer earmuff, that is, the outer earmuff 211 is provided with a silencing opening penetrating through a wall of the outer earmuff, and the belly cavity of the silencing structure 110 is communicated with a cover cavity of the outer earmuff 211 through the silencing opening and the sound absorption opening. Specifically, an inner wall of the silencing opening is provided with internal threads, and an outer wall of the sound absorption opening is provided with external threads. Detachable connection between the sound shielding device 100 and the outer earmuff 210 is realized through a threaded assembly relationship between the internal threads of the silencing opening and the external threads of the sound absorption opening.

Optionally, there are two noise-reducing earmuffs 210, and the masking earphone 200 further includes an arc-shaped connecting handle 220, one end of which is fixedly connected with the outer earmuff 211 of one of the two noise-reducing earmuffs 210, and the other end of which is fixedly connected with the outer earmuff 211 of the other one of the two noise-reducing earmuffs 210.

Specifically, the noise-masking earphone 200 includes a left earmuff and a right earmuff, and structures of the left earmuff and the right earmuff are that described with respect to the noise-reducing earmuff 210. One end of the arc-shaped connecting handle 220 is fixedly connected with the outer earmuff 211 of a left earmuff, and the other end of the arc-shaped connecting handle 220 is fixedly connected with the outer earmuff 211 of a right earmuff.

Optionally, the arc-shaped connecting handle 220 can be telescopic.

Optionally, the arc-shaped connecting handle 220 can be bent.

Optionally, a cross section of the outer earmuff 211 is oval in shape.

To sum up, in the noise-masking earphone 200 described above, the inner earmuff 212 is detachably arranged in the outer earmuff 211 through a spring 213, the outer earmuff 211 can cover the ear of the user, and the inner earmuff 212 can be plugged into the external acoustic foramen of the user, so that the inner earmuff 212 can be firmly positioned at the external acoustic foramen of the user by the spring 213 and is not easy to fall off. Meanwhile, the spring 213 can facilitate adjusting of the earphone used by different users, that is, a position of the inner earmuff 212 can be adjusted from a depth, front, back, left or right directions, so that the inner earmuff 212 can be in a comfortable position for the user to wear. In the embodiment of the present disclosure, a length of the spring 213 is greater than a depth of the cover cavity of the outer earmuff 211. Combined with the sound masking device 100 described above, when silencing is needed, the silencing clip 120 is released, so that the sound masking device 100 can absorb the sound, thereby achieving silencing effect, that is, when the user does not want to hear unwanted sounds from the earphone, the sound masking device 100 can be opened to achieve silencing, and when the user does not need silencing, the sound masking device 100 can be closed. In addition, the noise-masking earphone 200 includes the outer earmuff 211 and the inner earmuff 212. The inner earmuff 212 extends into the external acoustic foramen so as to transmit the sound to the ear of the user, which can improve the effective transmission of sound to the user's ear and improve sound effect of the noise-masking earphone 200. Meanwhile, the outer earmuff 211 covers the user's ear to isolate external sounds from the outside, which can reduce influence of external noise on the user on one hand and prevent the user's earphone from leaking sound to affect surrounding environment on the other hand. To sum up, the masking earphone 200 according to this disclosure can achieve silencing from at least four aspects, with good silencing effect.

As shown in FIG. 2, a sound noise-masking method is provided in an embodiment of the present disclosure, which includes following steps S101 to S104.

In step S101, a received sound is received. The received sound is an external sound received by the noise-masking earphone for misophonia.

The receive sound is a piece of sound acquired in a short period of time for rapid response.

In step S102, the sound information is obtained through a sound recognition model base on the received sound. The sound information includes a sound category, a sound existence duration and a semantic word. The sound category indicates a category of the creature or article a sound belongs to. The sound existence duration includes a sound start time and a sound end time. The semantic word represent a word in the sound.

The semantic word is obtained when the sound category is human voice, and when the sound category is not human voice, a value in the semantic word is set to 0. The sound start time is time when a sound in a certain sound category in the received sound start. The sound end time is time when a sound in a certain sound category in the received end start.

In step S103, a danger information set is acquired. The danger information set includes a danger category set and a danger word set. The danger category set includes a plurality of danger categories. The danger word set includes a plurality of danger words. Each of the danger categories indicates a type of a sound that a person with misophonia is not willing to hearing. The danger words are words that patients with misophonia is not willing to hearing.

In step S104, a delivery sound is obtained based on the received sound, the sound information and the danger information set.

Optionally, a step in which the delivery sound is obtained based on the received sound, the sound information and the danger information set includes following content.

A plurality of replacing audio categories is obtained. The plurality of replacing audio categories each are categories of audio that replace a sensitive sound.

If an original audio is dog barking, the replacing audio is sound audio of "dog barking".

The plurality of replacing audio categories in turn are traversed to find a replacing audio with a replacing audio category same as the sound category in the sound information so as to obtain an accurate replacing audio, if the sound category belongs to the danger category set or the semantic word belongs to the danger word set; the accurate replacing audio is replacing information corresponding to the sound information.

A sound in the received sound with the sound existence duration is masked so as to obtain masked sound.

Replacement is performed using the accurate replacing audio from a sound starting position of the masked sound to obtain the delivery sound.

With the above method, a sound that the user is sensitive to is masked, but the sound affects life, and the user can't determine whether the masked sound really doesn't exist or is masked, so the replacing audio is used to remind the user.

Optionally, a training method of the sound recognition model includes following content.

A training set is obtained. The train set includes a plurality of training sounds and a corresponding plurality of labeled data. The plurality of training sounds represent a plurality of sounds that have been received by the noise-masking earphone for misophonia. The plurality of labeled data includes a plurality of labeled sound categories, a plurality of labeled semantic words, a plurality of labeled monophonic spectrograms, a plurality of labeled sound start time and a plurality of labeled sound end time. The plurality of labeled sound categories each indicate categories of sounds.

The plurality of labeled sound categories each indicate categories of sounds, for example, in this embodiment, a labeled sound category is a sound category of dog barking, 08.

Short-time Fourier transform is performed on the training sound to obtain a training spectrogram.

The training spectrogram is a spectrogram after noise removal and enhancement.

Overlapped sounds are separated based on the training spectrogram to obtain a plurality of training monophonic spectrograms.

Training sound information is obtained based on the plurality of training monophonic spectrograms. The training sound information includes a training sound category, a training sound existence duration and a training semantic pronunciation. The training sound existence duration including a training sound start time and a training sound end time.

A monophonic spectrogram loss value is obtained based on the plurality of training monophonic spectrogram and the corresponding plurality of labeled monophonic spectrograms.

A sound category loss value is obtained from the training sound category and the labeled sound category by a binary cross entropy loss function.

A semantic word loss value is obtained from the training semantic pronunciation and plurality of labeled semantic words by a binary cross entropy loss function.

A sound start time loss value is obtained from the training sound start time and the plurality of labeled sound start time by a binary cross entropy loss function.

A sound end time loss value is obtained from the training sound end time and the plurality of labeled sound end time by a binary cross entropy loss function.

A total loss value is obtained. The total loss value is a sum of the sound category loss value, the semantic word loss value, the sound start time loss value and the sound end time loss value.

A current number of training iterations of the sound recognition model and a preset maximum number of training iterations of the sound recognition model are obtained.

The preset maximum number of training iterations of the sound recognition model is 1500.

Training is stopped when the total loss value is less than or equal to a threshold value or the number of training iterations reaches the maximum number of iterations, so as to obtain a trained sound recognition model.

With the above method, an audio signal of the received sound is transformed into a two-dimensional image capable of representing a sound state through short-time Fourier transformation. Brightness in a two-dimensional image represents loudness of the sound, that is, its amplitude. There are several waves on a vertical line at the same time, and a final overlapped wave represents a frequency of sound. However, sometimes there may be some mixed sounds at the same time, and the computer can't distinguish them because of their fusion. A separate network is used to extract fused audio separately, and a spectrogram of an individual sound is obtained correspondingly and detected. By training the network, a sound recognition model that can accurately detect sound information can be obtained.

Optionally, a step of separating the overlapped sounds based on the spectrogram to obtain the plurality of monophonic spectrograms includes:

The training spectrogram is multiplied by a first separation matrix to obtain a first monophonic spectrogram. The first separation matrix is a constant for separating a monophonic spectrogram obtained by training from the spectrogram, and the first monophonic spectrogram is a spectrogram with only one sound separated from overlapped sounds.

The spectrogram and the first spectrogram are input into a frequency switch structure to obtain a first switch value. The first switch value of 1 indicates that the spectrogram can be continuously separated. The first switch value of 0 indicates that the spectrogram has been separated.

The spectrogram is multiplied by a second separation matrix to obtain a second monophonic spectrogram if the first switch value is 1.

The spectrogram, the first monophonic spectrogram and the second monophonic spectrogram are input into a frequency switch structure to obtain a second switch value The second switch value is obtained in a way similar to the first switch value, which is obtained by subtracting gray difference of the second spectrogram from an image obtained by comparing and subtracting a gray value of the spectrogram from a gray value of the first spectrogram.

A plurality of training monophonic spectrograms are obtained by repeatedly obtaining the switch value in the frequency switching structure until the switch value is 0; and the plurality of training spectrograms is a plurality of monophonic spectrograms separated when the switch value is 1.

Figure 3:
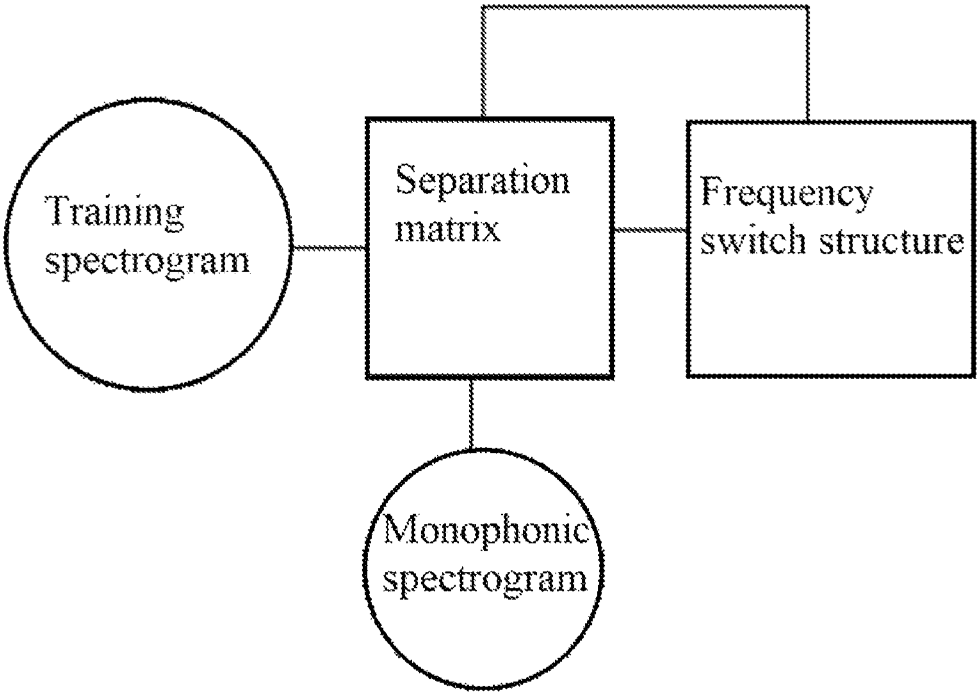
FIG. 3 shows a separation process in a sound noise-masking method according to an embodiment of the present disclosure.

A separation process is shown in FIG. 3.

With the above method, when two kinds of sounds are superimposed, there are different characteristics but they are not easy to be separated because of superposition of wave characteristics. The spectrogram is continuously divided and trained according to a number of divisions. The spectrogram is multiplied by an inverse matrix to get weights. Through cyclic addition, the training matrix is obtained through the labeled monophonic spectrogram, so that the monophonic spectrogram can be separated and different monophonic spectrograms can be obtained.

Optionally, a step of inputting the spectrogram and the first spectrogram into the frequency switch structure to obtain the switch value includes following content.

The spectrogram is grayed to obtain a grayed spectrogram.

The first spectrogram is grayed to obtain a first grayed spectrogram.

A gray value in the grayed spectrogram is subtracted from a gray value in the first spectrogram to obtain a gray difference spectrogram.

A plurality of aggregation-area gray value sets are obtained from the gray difference spectrogram by an aggregation algorithm.

The switch value is obtained based on the plurality of aggregation-area gray value sets.

With the above method, difference between two images is obtained from the gray difference and the like. Other unnecessary noise parts are removed according to the aggregation algorithm.

Optionally, a step of obtaining the switch value based on the plurality of aggregation-area gray value sets includes:

An optimal aggregation-area gray value set is obtained. The optimal aggregation-area gray value set is a set among the plurality of aggregation-area gray value sets that is larger than other aggregation-area gray value sets.

An optimal aggregation-area gray average is obtained. The optimal aggregation-area gray average is an average value of gray values in the optimal aggregation-area gray value set.

The switch value is set to 1 if the optimal aggregation-area gray average is great than a gray threshold.

The switch value is set to 0 if the optimal aggregation-area gray average is less that the gray threshold.

In this embodiment, the gray threshold is S.

With the above method, the gray average is compared with the gray threshold, and similar values of the two images are controlled, so as to obtain the switch value and determine whether to continue separation.

Optionally, the obtaining the training sound information based on the plurality of training monophonic spectrograms includes:

The monophonic spectrogram is input into a convolutional neural network and features are extracted to obtain a training monophonic feature map.

In this embodiment, a DENSET network is used as a network for discrimination.

The monophonic feature map is input into a fully connected layer to obtain the training sound category.

The training sound existence duration is obtained based the training monophonic feature map by a neural network.

Features in the sound feature map are classified by a neural network in terms of sound start time and sound end time, which is equivalent to obtaining frame values.

The monophonic feature map is input into a semantic recognition network to obtain the training semantic pronunciation, if the training sound category is human voice.

With the above method, information added to the network is clearly distinguished from information retained in a DenseNet architecture, and association with sound time is reserved. The feature map containing sound features can be better obtained.

Optionally, the obtaining the monophonic spectrogram loss value based on the plurality of training monophonic spectrograms and the corresponding plurality of labeled monophonic spectrograms includes:

The training monophonic spectrograms are rearranged to obtain a training monophonic vector.

Pixel values in a RGB layer each time for training a monophonic spectrogram are sequentially arranged into a one-dimensional training monophonic vector.

The labeled monophonic spectrograms are rearranged to obtain a labeled monophonic vector.

The labeled monophonic vector and the training monophonic vector are obtained by arranging in a same way.

The monophonic spectrogram loss value is obtained from the train monophonic vector and the labeled monophonic vector by a binary cross entropy loss function.

With the above method, the monophonic spectrogram separated from the spectrogram is arranged and extended into a vector, so that the training spectrogram can be close to the separation matrix of the labeled spectrogram by the binary cross entropy function.

With the above method, a sound that the user is sensitive to is masked, but the sound affects life, and the user can't determine whether the masked sound really doesn't exist or is masked, so the replacing audio is used to remind the user. The audio signal of the received sound is transformed into a two-dimensional image capable of representing a sound state through short-time Fourier transformation. Sometimes there may be some mixed sounds at the same time, and the computer can't distinguish them because of their fusion. A separate network is used to extract fused audio separately, and a spectrogram of an individual sound is obtained correspondingly and detected. By training the network, a sound recognition model that can accurately detect sound information can be obtained. When two kinds of sounds are superimposed, there are different characteristics but they are not easy to be separated because of superposition of wave characteristics. The spectrogram is continuously divided and trained according to a number of divisions. The spectrogram is multiplied by the inverse matrix to get weights. Through cyclic addition, the training matrix is obtained through the labeled monophonic spectrogram, so that the monophonic spectrogram can be separated and different monophonic spectrograms can be obtained. Difference between two images is obtained from the gray difference and the like. Other unnecessary noise parts are removed according to the aggregation algorithm. The information added to the network is clearly distinguished from the information retained in a DenseNet architecture, and association with sound time is reserved. The feature map containing sound features can be better obtained. The monophonic spectrogram separated from the spectrogram is arranged and extended into a vector, so that the training spectrogram can be close to the separation matrix of the labeled spectrogram by the binary cross entropy function.

Embodiment 2

Based on the sound noise-masking method described above, a sound noise-masking device for executing the sound noise-masking method described above is further provided in an embodiment of the present disclosure, and the sound noise-masking device includes a sound acquisition module, a sound recognition module, a danger information acquisition module and a danger information acquisition module.

The sound acquisition module is configured for acquiring a received sound. The received sound is a period of external sound received by the noise-masking earphone for misophonia.

The sound recognition model is configured for obtaining the sound information through the sound recognition model base on the received sound. The sound information includes the sound category, the sound existence duration and the semantic word. The sound category indicates a category of the creature or article a sound belongs to. The sound existence duration includes a sound start time and a sound end time. The semantic word represent a word in the sound.

The danger information acquisition module is configured for acquiring a danger information set. The danger information set includes the danger category set and the danger word set. The danger category set includes the plurality of danger categories. The danger word set includes the plurality of danger words. Each of the danger categories indicates the type of the sound that the person with misophonia is not willing to hearing. The danger words are words that patients with misophonia is not willing to hearing.

The danger sound replacement module is configured for obtaining a delivery sound based on the received sound, the sound information and the danger information set.

Optionally, the obtaining the delivery sound based on the received sound, the sound information and the danger information set includes:

obtaining a plurality of replacing audio categories; the plurality of replacing audio categories each being categories of audio that replace a sensitive sound;

traversing the plurality of replacing audio categories in turn to find a replacing audio with a replacing audio category same as the sound category in the sound information so as to obtain an accurate replacing audio, if the sound category belongs to the danger category set or the semantic word belongs to the danger word set; the accurate replacing audio being replacing information corresponding to the sound information;

masking a sound in the received sound with the sound existence duration so as to obtain masked sound; and performing replacement using the accurate replacing audio from a sound starting position of the masked sound to obtain the delivery sound.

Here, referring to the device in the above embodiments in which respective modules perform operations in specific manners described in detail in related embodiments of the method, detailed description will not be made in detail here.

Figure 4:
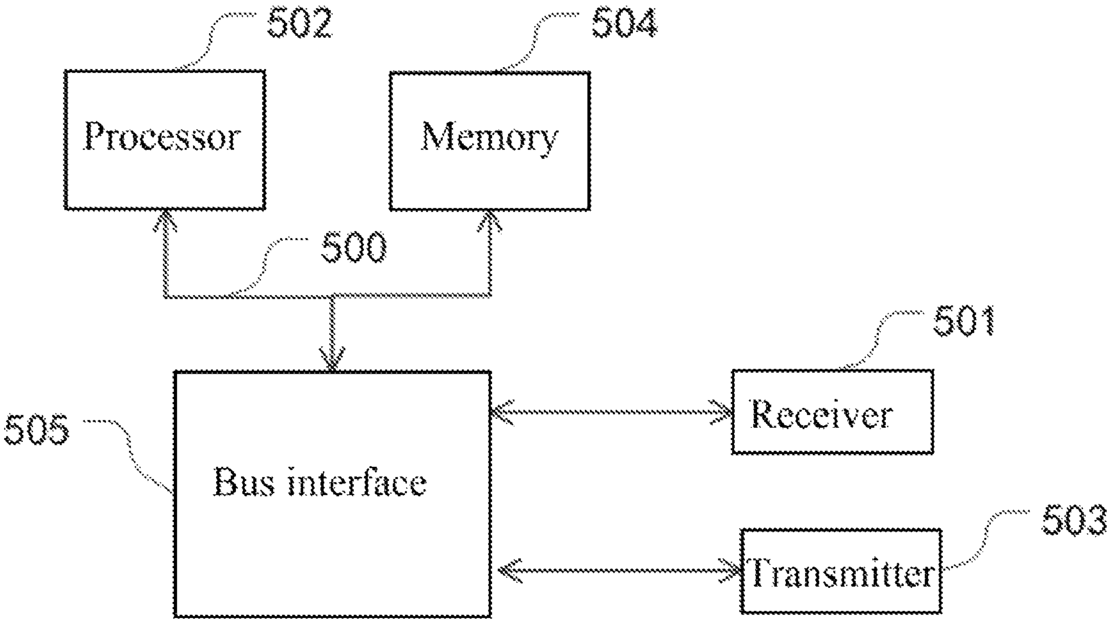
FIG. 4 is a schematic block diagram of a masking earphone according to an embodiment of the present disclosure.

A masking earphone is further provided in an embodiment of the present disclosure, as shown in FIG. 4, which includes a memory 504, a processor 502 and a computer program stored in the memory 504 and executable on the processor 502. The processor 502, when executing the program, realizes steps of any of methods by the sound noise-masking device described above.

In FIG. 4, in a bus architecture (represented by bus 500), the bus can include any number of interconnected buses and bridges, and the bus 500 links various circuits including one or more processors represented by a processor 502 and a memory represented by a memory 504. The bus 500 can also link various other circuits, such as peripheral devices, voltage regulators and power management circuits, which are well known in the art and therefore will not be further described here. A bus interface 505 provides an interface between the bus 500 and a receiver 501 and a transmitter 503. The receiver 501 and the transmitter 503 may be a same element, that is, a transceiver providing a unit for communicating with various other devices on a transmission medium. The processor 502 is responsible for managing the bus 500 and general processing, while the memory 504 can be used to store data used by the processor 502 when performing operations.

A computer-readable storage medium is further is provided in an embodiment of the disclosure, on which a computer program is stored. The computer program, when executed by a processor, realizes steps of any of methods described above and related data described above.

The algorithm and displaying provided herein are not inherently related to any particular computer, virtual system or other device. Various general-purpose systems can also be used together based on teaching of the disclosure. According to above description, a structure required to construct this kind of system is obvious. In addition, the present disclosure is not specific to any particular programming language. It should be understood that contents of the present disclosure described herein can be realized by various programming languages, and description of specific languages above is to disclose a best mode of the present disclosure.

In the description provided herein, numerous specific details are set forth. However, it is to be understood that embodiments of the disclosure may be practiced without these specific details. In some instances, well-known methods, structures and techniques have not been shown in detail so as not to obscure understanding of this specification.

Similarly, it should be understood that in above description of the exemplary embodiments of the present disclosure, various features of the present disclosure are sometimes grouped together into a single embodiment, figure, or description thereof, in order to simplify the present disclosure and help to understand one or more aspects of the present disclosure. However, the disclosed method should not be constructed as reflecting intention that claimed disclosure requires more features than those explicitly recited in each claim. Rather, as reflected in the following claims, an inventive aspect lies in less than all features of a single embodiment disclosed previously. Therefore, claims following a specific embodiment are hereby expressly incorporated into the specific embodiment, in which each claim stands as a separate embodiment of the disclosure.

It can be understood by those skilled in the art that the modules in the device in the embodiment can be adaptively changed and set in one or more devices different from that in the embodiment. The modules or units or components in the embodiment can be combined into one module or unit or component, and in addition, they can be divided into a plurality of submodules or subunits or subassemblies. Except that at least some of such features and/or processes or units are mutually exclusive, all features disclosed in this specification (including accompanying claims, abstract and drawings) and all processes or units of any method or apparatus thus disclosed can be combined in any manner. Unless explicitly stated otherwise, each feature disclosed in this specification (including the accompanying claims, abstract and drawings) may be replaced with an alternative feature that serves the same, equivalent or similar purpose.

Furthermore, it can understood by those skilled in the art that although some embodiments herein include some features but not others included in other embodiments, combination of features of different embodiments is intended to be within the scope of the present disclosure and forms different embodiments. For example, in the following claims, any one of the claimed embodiments can be used in any combination.

Various component embodiments of the present disclosure may be implemented in hardware, or in software modules running on one or more processors, or in a combination thereof. It should be understood by those skilled in the art that a microprocessor or a digital signal processor (DSP) can be used in practice to realize some or all functions of some or all components in the device according to the embodiment of the present disclosure. The present disclosure can also be implemented as a device or apparatus program (e.g., a computer program and a computer program product) for performing a part or all of methods described herein. Such a program for implementing the present disclosure may be stored on a computer-readable medium, or may be in a form of one or more signals. Such a signal can be downloaded from an Internet website, or provided on a carrier signal, or provided in any other form.

It should be noted that the embodiments are intended to illustrate, but not limit, the disclosure, and alternative embodiments can be designed by those skilled in the art without departing from the scope of the appended claims. In the claims, any reference signs placed between parentheses shall not be constructed as limitations on the claims. A word "comprising" does not exclude presence of elements or steps not listed in a claim. A word "a" or "an" preceding an element does not exclude presence of a plurality of such elements. The disclosure can be realized by means of hardware comprising several different elements and by means of a suitably programmed computer. In a unit claim enumerating several devices, several of these device can be embodied by a same item of hardware. Use of the words first, second, and third does not indicate any order. These words can be interpreted as names.

What is claimed is:

1. A sound noise-masking method, comprising:

acquiring a received sound, the received sound being a period of external sound received by a noise-masking earphone for misophonia;

obtaining sound information through a sound recognition model base on the received sound, the sound information comprising a sound category, a sound existence duration and a semantic word, the sound category indicating a category of a creature or an article the sound belongs to, the sound existence duration comprising a sound start time and a sound end time, and the semantic word representing a word in the sound;

acquiring a danger information set, the danger information set comprising a danger category set and a danger word set, the danger category set comprising a plurality of danger categories, the danger word set comprising a plurality of danger words, each of the plurality of danger categories indicating a type of a sound that a person with misophonia is not willing to hearing, and the plurality of danger words being words that patients with misophonia is not willing to hearing; and obtaining a delivery sound based on the received sound, the sound information and the danger information set.

2. The sound noise-masking method according to claim 1, wherein the obtaining the delivery sound based on the received sound, the sound information and the danger information set comprises:

obtaining a plurality of replacing audio categories; the plurality of replacing audio categories each being categories of audio that replace a sensitive sound;

traversing the plurality of replacing audio categories in turn to find a replacing audio with a replacing audio category same as the sound category in the sound information so as to obtain an accurate replacing audio, if the sound category belongs to the danger category set or the semantic word belongs to the danger word set; the accurate replacing audio being replacing information corresponding to the sound information;

masking a sound in the received sound with the sound existence duration so as to obtain masked sound; and performing replacement using the accurate replacing audio from a sound starting position of the masked sound to obtain the delivery sound.

3. The sound noise-masking method according to claim 1, wherein a training method of the sound recognition model comprises:

obtaining a training set; the train set comprising a plurality of training sounds and a corresponding plurality of labeled data; the plurality of training sounds representing a plurality of sounds that have been received by the noise-masking earphone for misophonia; the plurality of labeled data comprising a plurality of labeled sound categories, a plurality of labeled semantic words, a plurality of labeled monophonic spectrograms, a plurality of labeled sound start time and a plurality of labeled sound end time; the plurality of labeled sound categories each indicating categories of sounds;

performing short-time Fourier transform on the training sound to obtain a training spectrogram;

separating overlapped sounds based on the training spectrogram to obtain a plurality of training monophonic spectrograms;

obtaining training sound information based on the plurality of training monophonic spectrograms; the training sound information comprising a training sound category, a training sound existence duration and a training semantic pronunciation; the training sound existence duration comprising a training sound start time and a training sound end time;

obtaining a monophonic spectrogram loss value based on the plurality of training monophonic spectrograms and the corresponding plurality of labeled monophonic spectrograms;

obtaining a sound category loss value from the training sound category and the plurality of labeled sound categories by a binary cross entropy loss function;

obtaining a semantic word loss value from the training semantic pronunciation and the plurality of labeled semantic words by a binary cross entropy loss function;

obtaining a sound start time loss value from the training sound start time and the plurality of labeled sound start time by a binary cross entropy loss function;

obtaining a sound end time loss value from the training sound end time and the plurality of labeled sound end time by a binary cross entropy loss function;

obtaining a total loss value; the total loss value being a sum of the sound category loss value, the semantic word loss value, the sound start time loss value and the sound end time loss value;

obtaining a current number of training iterations of the sound recognition model and a preset maximum number of training iterations of the sound recognition model; and stopping training when the total loss value is less than or equal to a threshold value or the number of training iterations reaches the maximum number of iterations, so as to obtain a trained sound recognition model.

4. The sound noise-masking method according to claim 3, wherein the separating the overlapped sounds based on the training spectrogram to obtain the plurality of training monophonic spectrograms comprises:

multiplying the training spectrogram by a first separation matrix to obtain a first monophonic spectrogram; the first separation matrix being a constant for separating a monophonic spectrogram obtained by training from the spectrogram; and the first monophonic spectrogram being a spectrogram with only one sound separated from overlapped sounds;

inputting the spectrogram and the first monophonic spectrogram into a frequency switch structure to obtain a first switch value; the first switch value of 1 indicating that the spectrogram continues to be separated; and the first switch value of 0 indicating that the spectrogram has been separated;

multiplying the spectrogram by a second separation matrix to obtain a second monophonic spectrogram if the first switch value is 1;

inputting the spectrogram, the first monophonic spectrogram and the second monophonic spectrogram into a frequency switch structure to obtain a second switch value; and obtaining a plurality of training monophonic spectrograms by repeatedly obtaining the switch value in the frequency switching structure until the switch value is 0; a plurality of training spectrograms being a plurality of monophonic spectrograms separated when the switch value is 1.

5. The sound noise-masking method according to claim 4, wherein the inputting the spectrogram and the first monophonic spectrogram into the frequency switch structure to obtain the switch value comprises:

graying the spectrogram to obtain a grayed spectrogram;

graying the first monophonic spectrogram to obtain a first grayed spectrogram;

subtracting a gray value in the grayed spectrogram from a gray value in the first monophonic spectrogram to obtain a gray difference spectrogram;

obtaining a plurality of aggregation-area gray value sets from the gray difference spectrogram by an aggregation algorithm; and obtaining the switch value based on the plurality of aggregation-area gray value sets.

6. The sound noise-masking method according to claim 5, wherein the obtaining the switch value based on the plurality of aggregation-area gray value sets comprises:

obtaining an optimal aggregation-area gray value set; the optimal aggregation-area gray value set being a set among the plurality of aggregation-area gray value sets that is larger than other aggregation-area gray value sets;

obtaining an optimal aggregation-area gray average; the optimal aggregation-area gray average being an average value of gray values in the optimal aggregation-area gray value set;

setting the switch value to 1 if the optimal aggregation-area gray average is greater than a gray threshold; and setting the switch value to 0 if the optimal aggregation-area gray average is less than the gray threshold.

7. The sound noise-masking method according to claim 4, wherein the obtaining the training sound information based on the plurality of training monophonic spectrograms comprises:

inputting the monophonic spectrogram into a convolutional neural network and extracting features to obtain a training monophonic feature map;

inputting the monophonic feature map into a fully connected layer to obtain the training sound category;

obtaining the training sound existence duration based on the training monophonic feature map by a neural network; and inputting the monophonic feature map into a semantic recognition network to obtain the training semantic pronunciation, if the training sound category is human voice.

8. The sound noise-masking method according to claim 3, wherein the obtaining the monophonic spectrogram loss value based on the plurality of training monophonic spectrograms and the corresponding plurality of labeled monophonic spectrograms comprises:

rearranging the plurality of training monophonic spectrograms to obtain a training monophonic vector;

rearranging the plurality of labeled monophonic spectrograms to obtain a labeled monophonic vector; and obtaining the monophonic spectrogram loss value from the train monophonic vector and the labeled monophonic vector by a binary cross entropy loss function.

* * * * *